United States Patent
Kim

(10) Patent No.: US 12,356,241 B2
(45) Date of Patent: Jul. 8, 2025

(54) METHOD AND APPARATUS FOR BUFFER STATUS REPORTING BASED ON ADDITIONAL FORMAT IN MOBILE WIRELESS COMMUNICATION SYSTEM

(71) Applicants: BLACKPIN INC., Seoul (KR); Soenghun Kim, Gyeonggi-do (KR)

(72) Inventor: Soenghun Kim, Gyeonggi-do (KR)

(*) Notice: Subject to any disclaimer, the term of this patent is extended or adjusted under 35 U.S.C. 154(b) by 21 days.

(21) Appl. No.: 18/775,154

(22) Filed: Jul. 17, 2024

(65) Prior Publication Data
US 2025/0071607 A1    Feb. 27, 2025

(30) Foreign Application Priority Data
Aug. 24, 2023 (KR) .................. 10-2023-0111248

(51) Int. Cl.
| | |
|---|---|
| H04W 28/02 | (2009.01) |
| H04L 1/00 | (2006.01) |
| H04L 1/1607 | (2023.01) |
| H04W 76/20 | (2018.01) |

(52) U.S. Cl.
CPC ....... H04W 28/0278 (2013.01); H04L 1/0008 (2013.01); H04L 1/1614 (2013.01); H04W 76/20 (2018.02)

(58) Field of Classification Search
None
See application file for complete search history.

(56) References Cited

U.S. PATENT DOCUMENTS

2024/0244479 A1* 7/2024 Kanamarlapudi .......................... H04W 28/0278

FOREIGN PATENT DOCUMENTS

| WO | WO2023047335 | * | 9/2022 |
|---|---|---|---|
| WO | WO2024162027 | * | 1/2024 |

OTHER PUBLICATIONS

3GPP, "3Rd Generation Partnership Project; Technical Specification Group Radio Access Network; NR; Packet Data Convergence Protocol (PDCP) specification (Release 17)", Jun. 2023, pp. 1-49, 3GPP TS 38.323 V15.5.0 http://www.3gpp.org.
3GPP,"TSG-RAN WG2 Meeting #123, R2-2307076", Toulouse, France, Aug. 21-25, 2023, pp. 1-26.
3GPP,"Configured grant enhancements for XR", TSG-RAN WG2 Meeting #123, Toulouse, France, Aug. 21-25, 2023, pp. 1-3.
3GPP,"Discussion on RAN2 impacts of Multi-PUSCH CG", TSG-RAN WG2 Meeting #123, Toulouse, France, Aug. 21-25, 2023, pp. 1-7.
3GPP,"Discussion on MAC enhancements for XR-specific capacity improvement", TSG-RAN WG2 Meeting #123, Toulouse, France, Aug. 21-25, 2023, pp. 1-6.
3GPP,"BSR Enhancements for XR", TSG-RAN WG2 Meeting #123, Toulouse, France, Aug. 21-25, 2023, pp. 1-6.
3GPP, "Discussion on BSR enhancements for XR", TSG-RAN WG2 Meeting #123, Toulouse, France, Aug. 21-25, 2023, pp. 1-11.

(Continued)

*Primary Examiner* — Mohammad S Adhami
(74) *Attorney, Agent, or Firm* — Kevin P. Radigan, Esq.; Heslin Rothenberg Farley & Mesiti P.C.

(57) ABSTRACT

A method and apparatus to improve uplink scheduling efficiency is provided. This disclosure provides methods and apparatus to selecting format for a triggered BSR with consideration on RRC configuration and amount of data to be reported and number of logical channel groups to be reported. With the method, more accurate reporting is enabled when certain conditions are fulfilled.

10 Claims, 9 Drawing Sheets

(56) References Cited

OTHER PUBLICATIONS

3GPP, "BSR enhancements for XR", TSG-RAN WG2 #123, Toulouse, France, Aug. 21-25, 2023, pp. 1-4.
3GPP, 3rd Generation Partnership Project; Technical Specification Group Radio Access Network; NR; Radio Resource Control (RRC) protocol specification (Release 17), Jun. 2023, pp. 1-1328, 3GPP TS 38.331 V17.5.0, http://www.3gpp.org.
3GPP, 3rd Generation Partnership Project; Technical Specification Group Radio Access Network; NR; NR and NG- RAN Overall Description; Stage 2 (Release 17), Jun. 2023, pp. 1-211, 3GPP TS 38.300 V17.5.0, http://www.3gpp.org.
3GPP, 3rd Generation Partnership Project; Technical Specification Group Radio Access Network; NR; Medium Access Control (MAC) protocol specification (Release 17), Jun. 2023, pp. 1-253, 3GPP TS 38.321 V17.5.0, http://www.3gpp.org.
3GPP, "TSG-RAN WG2 Meeting #123 R2-2308352", Toulouse, France, Aug. 21-25, 2023, pp. 1-1312.
3GPP, "TSG-RAN2 Meeting #123 R2-2308696", Toulouse, France, Aug. 21-25, 2023, pp. 1-6.

\* cited by examiner

Short BSR format

| R | R | LCID |
|---|---|---|
| LCG ID | | Short BS field (BS1) |

FIG.2B

Long BSR format

| R | F | LCID |
|---|---|---|
| L | | |
| Bitmap1 | | |
| Long BS field (BS2) | | |
| ... | | |
| Long BS field (BS2) | | |

FIG.2C

Short BSR2 format

| R | R | LCID | | | | |
|---|---|------|---|---|---|---|
| \multicolumn{7}{|c|}{eLCID} |
| LCG ID | | BSTind | R | R | R | R |
| \multicolumn{7}{|c|}{Long BS field (BS2 or BS3)} |

FIG.2D

Long BSR2 format

| R | R | LCID |
|---|---|------|
| \multicolumn{3}{|c|}{eLCID} |
| \multicolumn{3}{|c|}{L} |
| \multicolumn{3}{|c|}{Bitmap1} |
| \multicolumn{3}{|c|}{Bitmap2} |
| \multicolumn{3}{|c|}{Long BS field (BS2 or BS3)} |
| \multicolumn{3}{|c|}{...} |
| \multicolumn{3}{|c|}{Long BS field (BS2 or BS3)} |

FIG.2E

METHOD AND APPARATUS FOR BUFFER STATUS REPORTING BASED ON ADDITIONAL FORMAT IN MOBILE WIRELESS COMMUNICATION SYSTEM

CROSS-REFERENCE TO RELATED APPLICATION

This application claims priority to and the benefit of Korean Patent Application No. 10-2023-0111248, field on Aug. 24, 2023, the disclosure of which is hereby incorporated herein by reference in its entirety.

BACKGROUND

Technical Field

The present disclosure relates to buffer status reporting in wireless mobile communication system.

Related Art

To meet the increasing demand for wireless data traffic since the commercialization of 4th generation (4G communication systems), the 5th generation (5G system) is being developed. 5G system introduced millimeter wave (mmW) frequency bands (e.g. 60 GHZ bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency.

Extended Reality (XR) refers to all real-and-virtual combined environments and human-machine interactions generated by computer technology and wearables. XR is an umbrella term for different types of realities. During a XR service, huge amount of Data Bursts may be generated and transmitted over NR downlink and uplink. To make the XR services sustainable in NR network, it is necessary to enhance scheduling to cope with huge data generated by XR devices.

SUMMARY

Aspects of the present disclosure are to address the problems of supporting XR services in mobile communication system. The method of the terminal includes receiving a radio resource control (RRC) message, triggering a buffer status report (BSR), determining format of the BSR among a first format and a second format and a third format, and transmitting the BSR based on determined format. The terminal determines the format based on number of logical channel groups to be reported and based on whether additional buffer size table is allowed.

BRIEF DESCRIPTION OF THE DRAWINGS

FIG. 2B is a diagram illustrating Short BSR.
FIG. 2C is a diagram illustrating Long BSR.
FIG. 2D is a diagram illustrating Short BSR2.
FIG. 2E is a diagram illustrating Long BSR2.

DETAILED DESCRIPTION

Hereinafter, embodiments of the disclosure will be described in detail with reference to the accompanying drawings. In addition, in the description of the disclosure, if it is determined that a detailed description of a related known function or configuration may unnecessarily obscure the gist of the disclosure, the detailed description thereof will be omitted. In addition, the terms to be described later are terms defined in consideration of functions in the disclosure, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the 3GPP standards are used for convenience of explanation. However, the present disclosure is not limited by use of these terms and definitions and other arbitrary terms and definitions may be employed instead.

In the disclosure, "trigger" or "triggered" and "initiate" or "initiated" can be used interchangeably.

In the disclosure, UE and terminal can be used interchangeably. In the disclosure, NG-RAN node and base station and GNB can be used interchangeably.

Figure 1A:
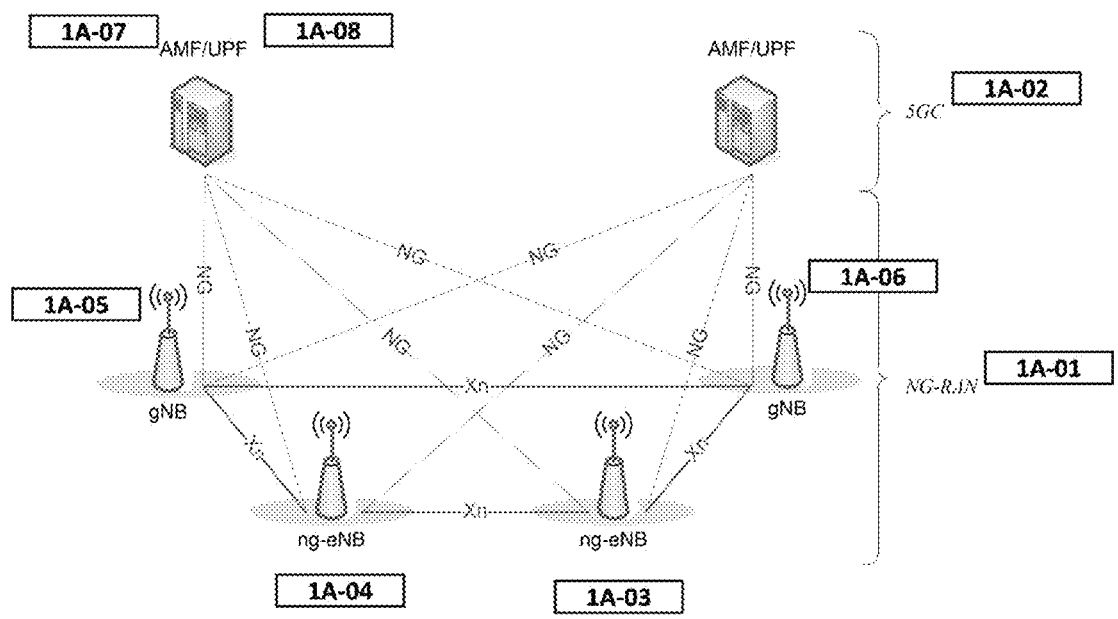
FIG. 1A is a diagram illustrating the architecture of an 5G system and a NG-RAN.

FIG. 1A is a diagram illustrating the architecture of an 5G system and a NG-RAN to which the disclosure may be applied.

5G system consists of NG-RAN 1A-01 and 5GC 1A-02. The GNBs 1A-05 or 1A-06 and ng-eNBs 1A-03 or 1A-04 are interconnected with each other by means of the Xn interface. The GNBs and ng-eNBs are also connected by means of the NG interfaces to the 5GC, more specifically to the AMF (Access and Mobility Management Function) and to the UPF (User Plane Function). AMF 1A-07 and UPF 1A-08 may be realized as a physical node or as separate physical nodes.

A GNB 1A-05 or 1A-06 or an ng-eNBs 1A-03 or 1A-04 hosts various functions such as Radio Resource Management, Security, Scheduling and measurement management.

The AMF 1A-07 hosts the functions such as NAS signaling, NAS signaling security, AS security control, SMF selection, Authentication, Mobility management and positioning management.

The UPF 1A-08 hosts the functions such as packet routing and forwarding, transport level packet marking in the uplink, QoS handling and the downlink, mobility anchoring for mobility etc.

Figure 1B:
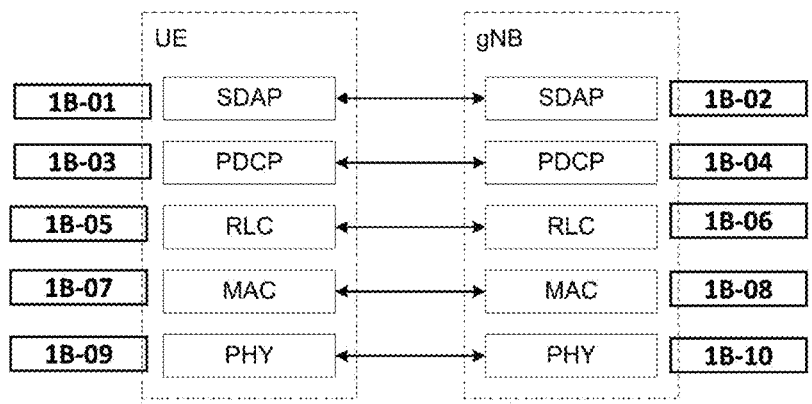
FIG. 1B is a diagram illustrating a wireless protocol architecture in an 5G system.
Figure 1B:
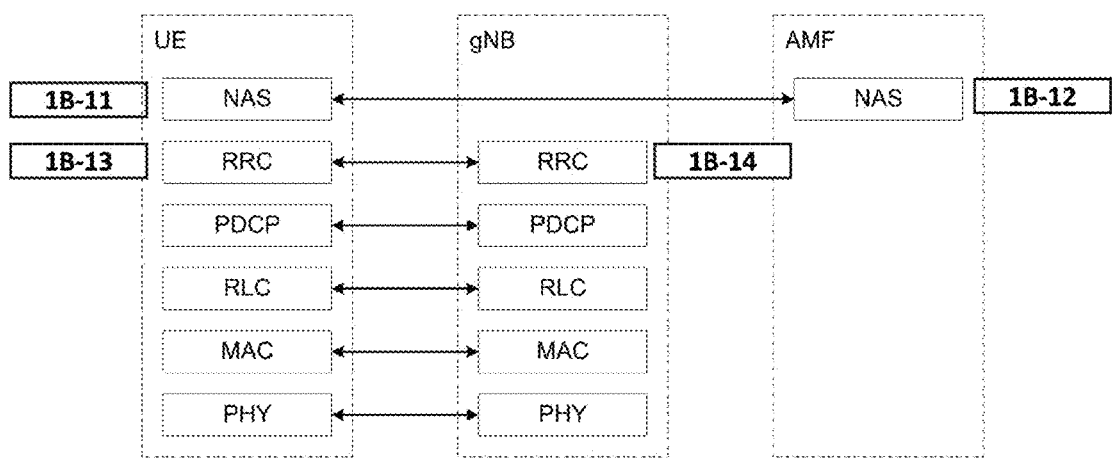
Figure 1C:
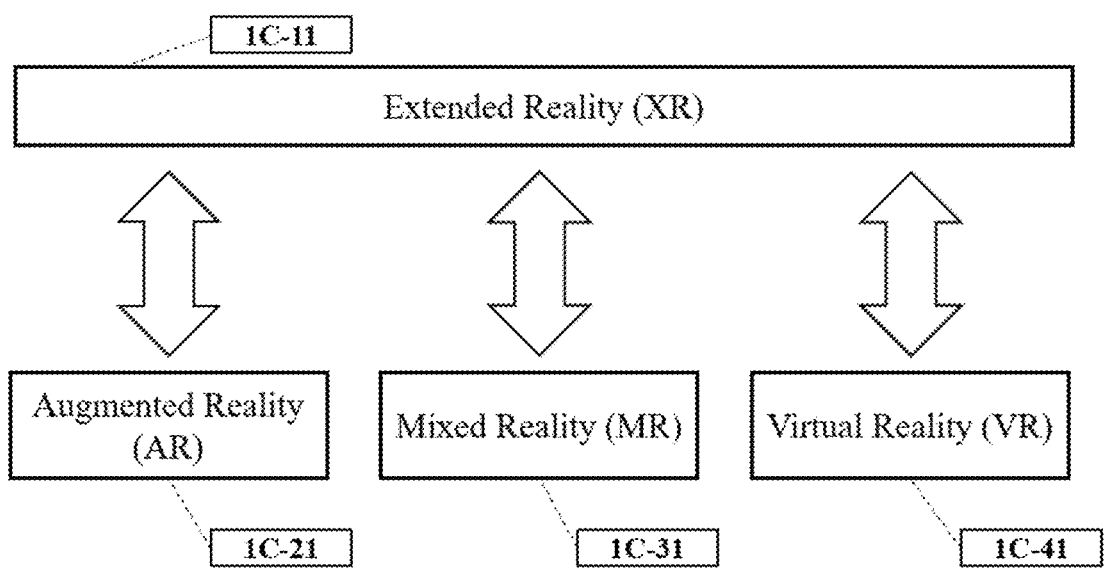
FIG. 1C is a diagram illustrating extended reality.
Figure 1D:
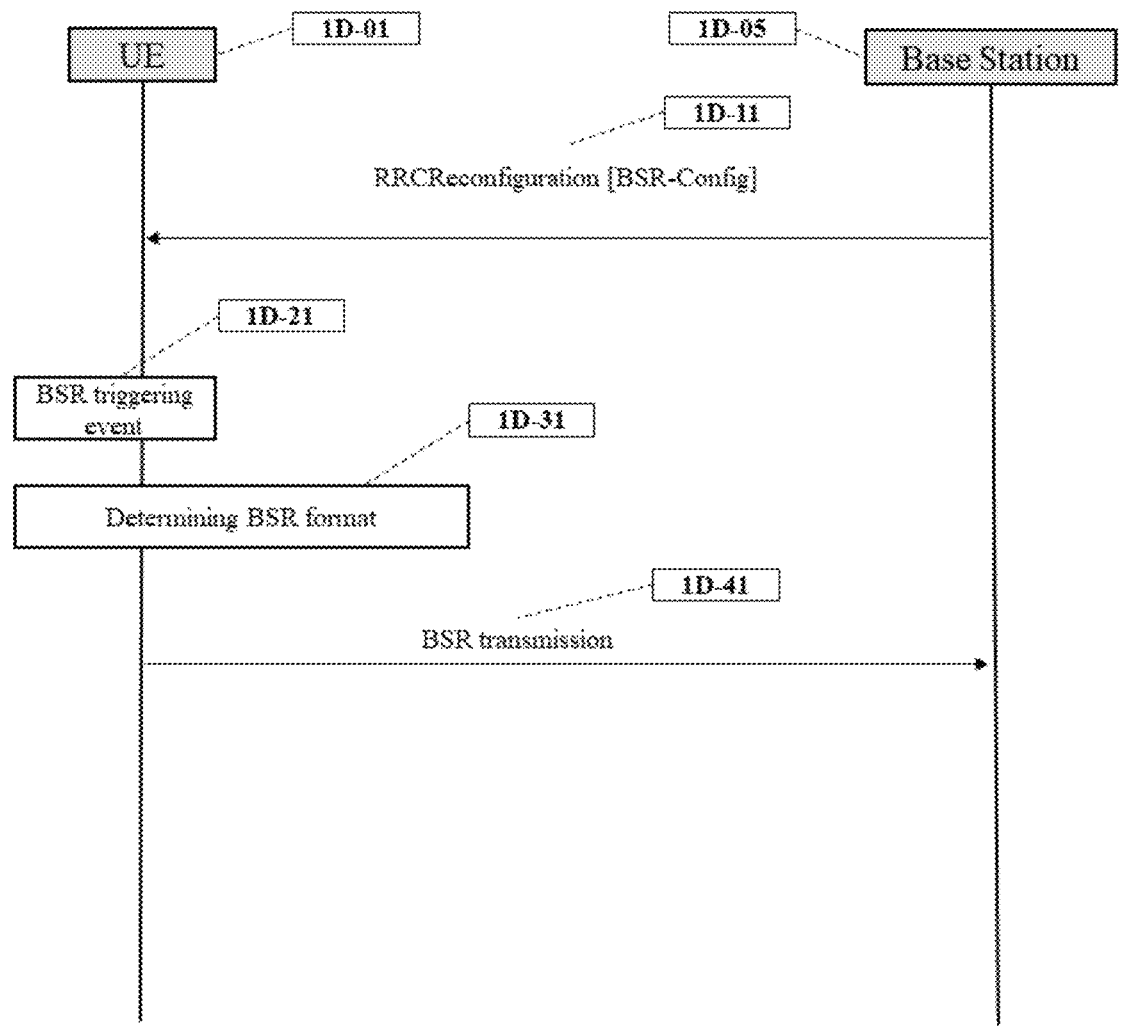
FIG. 1D is a diagram illustrating buffer status reporting procedure.

FIG. 1B is a diagram illustrating a wireless protocol architecture in an 5G system to which the disclosure may be applied.

User plane protocol stack consists of SDAP 1B-01 or 1B-02, PDCP 1B-03 or 1B-04, RLC 1B-05 or 1B-06, MAC 1B-07 or 1B-08 and PHY 1B-09 or 1B-10. Control plane protocol stack consists of NAS 1B-11 or 1B-12, RRC 1B-13 or 1B-14, PDCP, RLC, MAC and PHY.

Each protocol sublayer performs functions related to the operations listed below.

NAS: authentication, mobility management, security control etc.

RRC: System Information, Paging, RRC connection management, Security functions, radio bearer management, Mobility, QoS management, Detection of and recovery from radio link failure, NAS message transfer etc.

SDAP: Mapping between a QoS flow and a data radio bearer, Marking QoS flow ID (QFI) in both DL and UL packets.

PDCP: Transfer of data, Header compression and decompression, Ciphering and deciphering, Integrity protection and integrity verification, Duplication, Reordering and in-order delivery, Out-of-order delivery etc.

RLC: Transfer of upper layer PDUs, Error Correction through ARQ, Segmentation and re-segmentation of RLC SDUs, Reassembly of SDU, RLC re-establishment etc.

MAC: Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling etc.

PHY: Channel coding, Physical-layer hybrid-ARQ processing, Rate matching, Scrambling, Modulation, Layer mapping, Downlink Control Information, Uplink Control Information etc.

extended Reality (XR) 1C-11 is one of the most important 5G media applications under consideration in the industry. XR is an umbrella term for different types of realities and refers to all real-and-virtual combined environments and human-machine interactions generated by computer technology and wearables. It includes representative forms such as Augmented Reality (AR) 1C-21, Mixed Reality (MR) 1C-31 and Virtual Reality (VR) 1C-41 and the areas interpolated among them.

NG NR is designed to support applications demanding high throughput and low latency in line with the requirements posed by the support of XR in NR networks.

In addition to Smartphone based XR, XR experience is expected to be delivered via Head Mounted Displays (HMDs). The power considerations for HMDs are different from those of Smartphones. In particular, the power capacity of AR glasses can be significantly lower than that of a smartphone. The AR glasses can have an embedded 5G modem providing 5G connectivity, or the AR glasses can be tethered to a Smartphone for 5G connectivity. In both cases, the 5G connection must carry AR application traffic, and the UE power consumption from that traffic has a significant bearing on the viability of such AR glasses products. There are several factors that are crucial for providing XR services. For example, power consumption is important since XR device may be power limited. Capacity is also important due to high data rate requirement of XR traffic.

One way to improve the power consumption and capacity is to provide uplink buffer status with finer granularity. It improves the power consumption and capacity by reducing unnecessary uplink transmission.

Unlike downlink traffic, the scheduler in the base station does not know when and how much and how important data arrives in the UE. To provide information on buffer status, the UE may transmit a Buffer Status Report (BSR) MAC CE when deemed triggered. BSR MAC CE comprises one or more Buffer Size fields, each of which indicates the amount of data available for transmission across logical channels of a logical channel group.

The base station provides a BSR configuration via a dedicate RRC message such as RRC reconfiguration message 1D-11. The BSR configuration comprises a timer controlling periodic reporting and other information. The mapping information between a logical channel and a logical channel group is also provided in the dedicate RRC message.

BSR can be triggered event-driven or periodically or based on padding. Upon a significant event that cause buffer status change or upon expiry of a timer or upon space for padding being available, BSR is triggered 1D-21.

A BSR shall be triggered if any of the following events occur for activated cell group:

UL data, for a logical channel which belongs to an LCG, becomes available to the MAC entity; and either
this UL data belongs to a logical channel with higher priority than the priority of any logical channel containing available UL data which belong to any LCG; or
none of the logical channels which belong to an LCG contains any available UL data.
in which case the BSR is referred below to as 'Regular BSR';
UL resources are allocated and number of padding bits is equal to or larger than the size of the Buffer Status Report MAC CE plus its sub-header, in which case the BSR is referred below to as 'Padding BSR';
retxBSR-Timer expires, and at least one of the logical channels which belong to an LCG contains UL data, in which case the BSR is referred below to as 'Regular BSR';
periodic BSR-Timer expires, in which case the BSR is referred below to as 'Periodic BSR'.

The UE determines the format of the BSR depending on which event triggers the BSR 1D-31.

The UE transmits the BSR 1D-41 based on the determination.

Based on the number of logical channel groups with data available for transmission, a short format and a long format are defined.

Based on whether all logical channels can be reported or not, a truncated format and the normal/full format are defined.

Short BSR and Short Truncated BSR comprise following fields:

>1: LCG ID field indicates the identifier of LCG whose buffer status is being reported.
>1: short Buffer Size field indicates the total amount of data available across all logical channels of a logical channel group. The amount of data is indicated in number of bytes. The length of this field is 5 bit.

Long BSR and Long Truncated BSR comprises following fields:

>1: Bitmap field comprises 8 bit. Each bit indicates the presence of the Buffer Size field for the corresponding logical channel group;

>1: long Buffer Size field indicates the total amount of data available across all logical channels of a logical channel group. The amount of data is indicated in number of bytes. The length of this field is 8 bit.

In principle, since the information contained in BSR triggered due to new uplink data or timer expiry is crucial for uplink scheduling, BSR format is determined solely based on the number of LCGs for reporting. On the other hands, the information contained in BSR triggered due to padding is supplementary information for uplink scheduling, BSR format is determined based on the number of LCGs and the size of padding space.

The UE transmits a Short BSR in the following case:
>1: only one LCG has data available for transmission and the BSR is triggered due to new uplink data or timer expiry; or >1 only one LCG has data available for transmission and the size of padding is enough to accommodate the Short BSR.

The UE transmits a Short Truncated BSR in the following case:
>1: padding occurs (e.g. MAC SDUs or MAC CEs do not fill up all the available space of MAC PDU); and
>1: more than one LCG have data available for transmission; and
>1: the size of padding is not enough to accommodate a Long BSR or a Long Truncated BSR but enough to accommodate the Short Truncated BSR.

The UE transmits a Long BSR in the following case:
>1: more than one LCGs have data available for transmission and the BSR is triggered due to new uplink data or timer expiry.

The UE transmits a Long Truncated BSR in the following case:
>1: padding occurs; and
>1: more than one LCG have data available for transmission; and
>1: the size of padding is not enough to accommodate a Long BSR but enough to a Long Truncated BSR.

The UE transmits BSR 1D-41. To get the uplink resource for BSR transmission, if the BSR is triggered for new uplink data that is important than what are stored previously, scheduling request procedure can be initiated beforehand.

To improve uplink scheduling efficiency, this disclosure provides methods and apparatus to selecting format for a triggered BSR with consideration on RRC configuration and amount of data to be reported and number of logical channel groups to be reported. With the method, more accurate reporting is enabled when certain conditions are fulfilled.

Figure 2A:
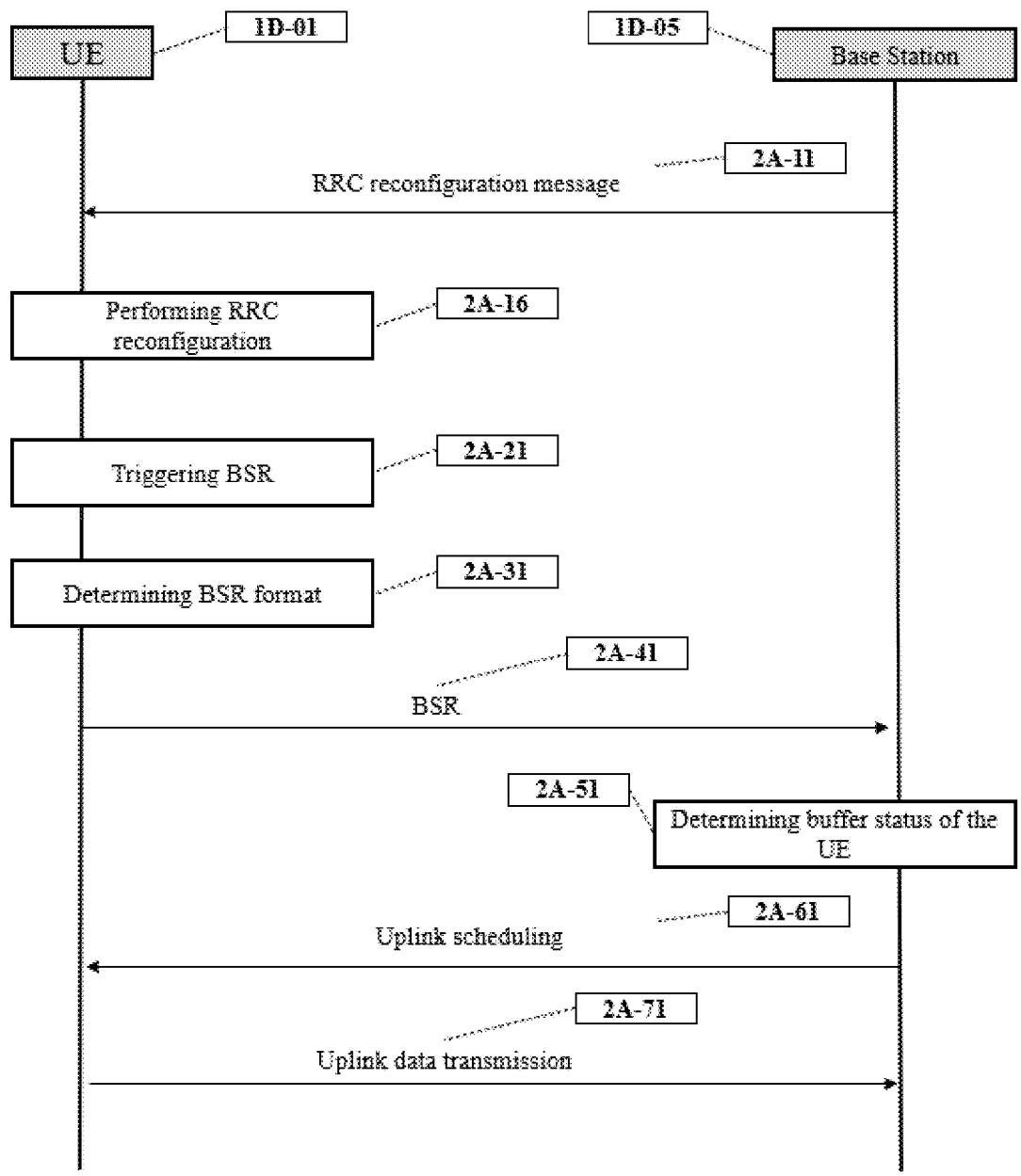
FIG. 2A is a diagram illustrating operations of a terminal and a base station

FIG. 2A illustrates the operation of UE and base station.

UE may store in non-volatile memory first buffer size table and second buffer size table and third buffer size table. buffer size table is used in determining index to be reported in buffer size field of BSR. UE is allowed to use the first buffer size table and the second buffer size table by default (e.g. without explicit configuration from the base station). UE is allowed to use the third buffer size table only when the base station allows.

UE receives from the base station a RRC reconfiguration message 2A-11. The RRC reconfiguration message comprises list of LCGs that are allowed to use the third buffer size table (additionalBSTallowedList). The RRC reconfiguration message comprises an indication that bsr2 format is allowed to be used (bsr2formatConfigured). The RRC reconfiguration message may comprise other parameter related to buffer status reporting.

If bsr2formatConfigured is set to true (or additionalBSTallowedList is configured/present), UE uses short BSR2 and long BSR2 for regular BSR.

If bsr2formatConfigured is set to true (or additionalBSTallowedList is configured/present), UE refers either to second buffer size table (e.g. buffer size table of which minimum BS is zero) or to third buffer size table (e.g. buffer size table of which minimum BS is larger than zero) when UE determines BS index to be reported.

If bsr2formatConfigured is not set to true (or additionalBSTallowedList is absent), UE refers to second buffer size table when UE determines BS index to be reported.

additionalBSTallowedList is bitmap of 8 bit. leftmost bit corresponds to LCG0 and rightmost bit corresponds to LCG7. Each bit indicates whether additional buffer size table is allowed to be used for the corresponding LCG.

UE performs RRC reconfiguration based on the received parameters in the RRC reconfiguration message 2A-16.

UE may configure signaling radio bearers and data radio bearers. UE may reconfigure MAC entity during which BSR functionality can be reconfigured and list of logical channel groups related with third buffer size table can be informed.

UE triggers a BSR upon occurrence of a predefined event 2A-21. The event may be expiry of timer or arrival of new uplink data or others.

UE determines format of the BSR to be transmitted 2A-31. UE determines based on the amount of data and number of LCGs to be reported and number of LCGs and other factors.

UE transmits BSR based on the determined format 2A-41.

Base station determines buffer status of the UE based on the received BSR 2A-51.

Base station instructs the UE to perform uplink transmission 2A-61 so that high priority data is transferred.

UE performs uplink data transmission accordingly 2A-71.

BSR is transmitted as a MAC CE together with the corresponding MAC sub-header in a MAC PDU.

Following MAC CEs and corresponding sub-headers are used for formats of the BSR.

TABLE 1

| LCID index | MAC CE | sub-header size | MAC CE size |
| --- | --- | --- | --- |
| 50 | Short Truncated BSR | 1B (LCID) | 1B (LCG ID 3b + BS1 5b) |
| 60 | Long Truncated BSR | 2B (LCID + L) | 1B (bitmap1) + n * 1B (BS2) |
| 61 | Short BSR | 1B (LCID) | 1B (LCG ID 3b + BS1 5b) |
| 62 | Long BSR | 2B (LCID + L) | 1B (bitmap1) + n * 1B (BS2) |
| 289 | Short BSR2 | 2B (ELCID) | 1B (LCG ID + BST ind) + 1B (BS2 or BS3) |
| 290 | Long BSR2 | 3B (ELCID + L) | 2B (bitmap1 + bitmap2) + n * 1B (BS2 or BS3) |

FIG. 2B illustrates Short BSR. Sub-header comprises a LCID field. Short BSR comprises a LCG ID field and short BS field. Short BSR and Short Truncated BSR have same format (with different LCID index). Short Truncated BSR is used only if the BSR is padding BSR.

The Logical Channel Group ID field identifies the group of logical channel whose buffer status is being reported. The length of the field is 3 bits.

Short BS field comprises a buffer size 1 (BS1). BS1 is buffer size index (or value indicated in the corresponding BS field) determined based on the first buffer size table. The size of Short BS field is 5 bit.

FIG. 2C illustrates Long BSR. Sub-header comprises F field and LCID field and L field. Long BSR comprises Bitmap1 and one or more Long BS fields. Long BSR and Long Truncated BSR have same format (with different LCID index). Long Truncated BSR is used only if the BSR is padding BSR.

Bitmap1 field comprises 8 $b\_i$ bit. $b\_0$ corresponds to logical channel group 0, $b\_1$ corresponds to logical channel group 1 and so on. The $b\_i$ bit set to 1 indicates that the Buffer Size field for the logical channel group i is reported. The $b\_i$ bit set to 0 indicates that the Buffer Size field for the logical channel group i is not reported.

Each Long BS field in Long BSR comprises a buffer size 2 (BS2). BS2 is buffer size index (or value indicated in the corresponding BS field) determined based on the second buffer size table. The size of Long BS field is 8 bit.

FIG. 2D illustrates Short BSR2. Sub-header comprises a LCID field and an eLCID field. Short BSR2 comprises an LCG ID field and BST indication field and a Long BS field. Long BS field comprises BS2 or BS3. BS3 is buffer size index (or value indicated in the corresponding BS field) determined based on the third buffer size table.

BST indication field indicates which buffer size table is used to set the Buffer Size field for the logical channel group. The BST indication field set to 1 indicates that the third buffer size table is used. The BST indication field set to 0 indicates that the second buffer size table is used.

FIG. 2E illustrates Long BSR2. Sub-header comprises a F field and a LCID field and an eLCID field and a L field. Long BSR2 comprises Bitmap1 and Bitmap2 and one or more Long BS fields.

Bitmap1 field comprises 8 $b\_i$ bit. $b\_0$ corresponds to logical channel group 0, $b\_1$ corresponds to logical channel group 1 and so on. The $b\_i$ bit set to 1 indicates that the Buffer Size field for the logical channel group i is reported. The $b\_i$ bit set to 0 indicates that the Buffer Size field for the logical channel group i is not reported.

Bitmap2 field comprises 8 $a\_i$ bit. $a\_0$ corresponds to logical channel group 0, $a\_1$ corresponds to logical channel group 1 and so on. The $a\_i$ bit set to 1 indicates that BS field of the corresponding logical channel group is determined based on the third buffer size table. The $a\_i$ bit set to 0 indicates that BS field of the corresponding logical channel group is determined based on the second buffer size table.

LCID field identifies the logical channel instance of the corresponding MAC SDU or the type of the corresponding MAC CE or padding. There is one LCID field per MAC sub-header. The size of the LCID field is 6 bits. If the LCID field is set to 34, one additional octet is present in the MAC sub-header containing the eLCID field and follow the octet containing LCID field.

eLCID field identifies the logical channel instance of the corresponding MAC SDU or the type of the corresponding MAC CE. The size of the eLCID field is either 8 bits or 16 bits. LCID index is determined based on eLCID field if eLCID field is present and based on LCID field if eLCID field is absent.

L field indicates the length of the corresponding MAC SDU or variable-sized MAC CE in bytes.

F field indicates the size of the Length field. TThe size of the F field is 1 bit. The value 0 indicates 8 bits of the Length field. The value 1 indicates 16 bits of the Length field.

UE performs BSR format determination as followings.

When regular BSR or periodic BSR is triggered:
UE determines Long BSR for all LCGs which have data available for transmission in case that:
more than one LCG has data available for transmission when the MAC PDU containing the BSR is to be built; and
bsr2 format is not configured (e.g. if bsr2formatConfigured is absent or additionalBSTallowedLis absent);
UE determines Long BSR2 for all LCGs which have data available for transmission in case that:
more than one LCG has data available for transmission when the MAC PDU containing the BSR is to be built; and
bsr2 format is configured (e.g. if bsr2formatConfigured is present or additionalBSTallowedLis present);
UE determines Short BSR for the LCG which has data available for transmission in case that:
only one LCG has data available for transmission when the MAC PDU containing the BSR is to be built; and
bsr2 format is not configured (e.g. if bsr2formatConfigured is absent or additionalBSTallowedLis absent);
UE determines Short BSR2 for the LCG which has data available for transmission in case that:
only one LCG has data available for transmission when the MAC PDU containing the BSR is to be built; and
bsr2 format is configured (e.g. if bsr2formatConfigured is present or additionalBSTallowedLis present).

When padding BSR is triggered:
UE determines Short Truncated BSR of the LCG with the highest priority logical channel with data available for transmission in case that:
the number of padding bits is equal to or larger than the size of the Short BSR plus its sub-header but smaller than the size of the Long BSR plus its sub-header;
more than one LCG has data available for transmission when the BSR is to be built; and
the number of padding bits is equal to the size of the Short BSR plus its sub-header;
UE determines Long Truncated BSR of the LCG(s) with the logical channels having data available for transmission following a decreasing order of the highest priority logical channel (with or without data available for transmission) in each of these LCG(s), and in case of equal priority, in increasing order of LCGIDin case that:
the number of padding bits is equal to or larger than the size of the Short BSR plus its sub-header but smaller than the size of the Long BSR plus its sub-header:
more than one LCG has data available for transmission when the BSR is to be built; and
the number of padding bits is larger than the size of the Short BSR plus its sub-header;
UE determines Short BSR in case that:
the number of padding bits is equal to or larger than the size of the Short BSR plus its sub-header but smaller than the size of the Long BSR plus its sub-header; and
only one LCG has data available for transmission when the BSR is to be built; UE determines Long BSR in case that:
number of padding bits is equal to or larger than the size of the Long BSR plus its sub-header.

Buffer size tables are characterized as below.

The first buffer size table has 32 indexes; the lowest index indicates 0 byte; 30 indexes (1~30) indicate a range of buffer sizes (e.g. greater than a specific value and smaller than or equal to another specific value); the highest index indicates BS is greater than 150000 byte; effective range of the first buffer size table is between 0 byte and 150000 byte.

The second buffer size table has 256 indexes; the lowest index indicates 0 byte; 253 indexes (1~253) indicate a range of buffer sizes; the second highest index (254) indicates BS is greater than 81338368 byte. the highest index is reserved. effective range of the second buffer size table is between 0 byte and 81338368 byte.

The third buffer size table has 256 indexes; each (including lowest index) indicates a range of buffer sizes; minimum value/lowest bound of the lowest index is non-zero byte (fixed in the specification; the expected smallest PDU set size for XR traffic); the maximum value/highest bound of the effectively highest index is zzz byte (fixed in the specification; the expected largest PDU set size for XR traffic). one or more highest indexes are reserved. Effective range of the third buffer size table is between the minimum value of the buffer size range of the lowest index and the maximum value of the buffer size range of the effectively highest index minus one (e.g. zzz-1 byte).

A first BSR format (e.g. Short BSR or Long BSR) does not comprise explicit information on buffer size table. A second BSR format (e.g. Short BSR2 or Long BSR2) comprises explicit information on buffer size table.

LCID index of MAC CE for the first BSR format is determined by value indicated in LCID field. LCID index of MAC CE for the second BSR format is determined by value indicated in LCID field and value indicated in eLCID field.

For regular BSR or periodic BSR, BSR format is determined between the legacy format and the new format considering whether new format is configured or not. For padding BSR, legacy format is used even when new format is configured.

For regular BSR or periodic BSR, a second BSR MAC CE (BSR that uses ELCID) is used in case that BSR2 is configured (or additional buffer size table is configured to be allowed) and a first BSR MAC CE (BSR that uses only LCID) is used in case that BSR2 is not configured (or additional buffer size table is not configured to be allowed). For padding BSR, the first MAC CE is used even in case that BSR2 is configured.

Figure 3:
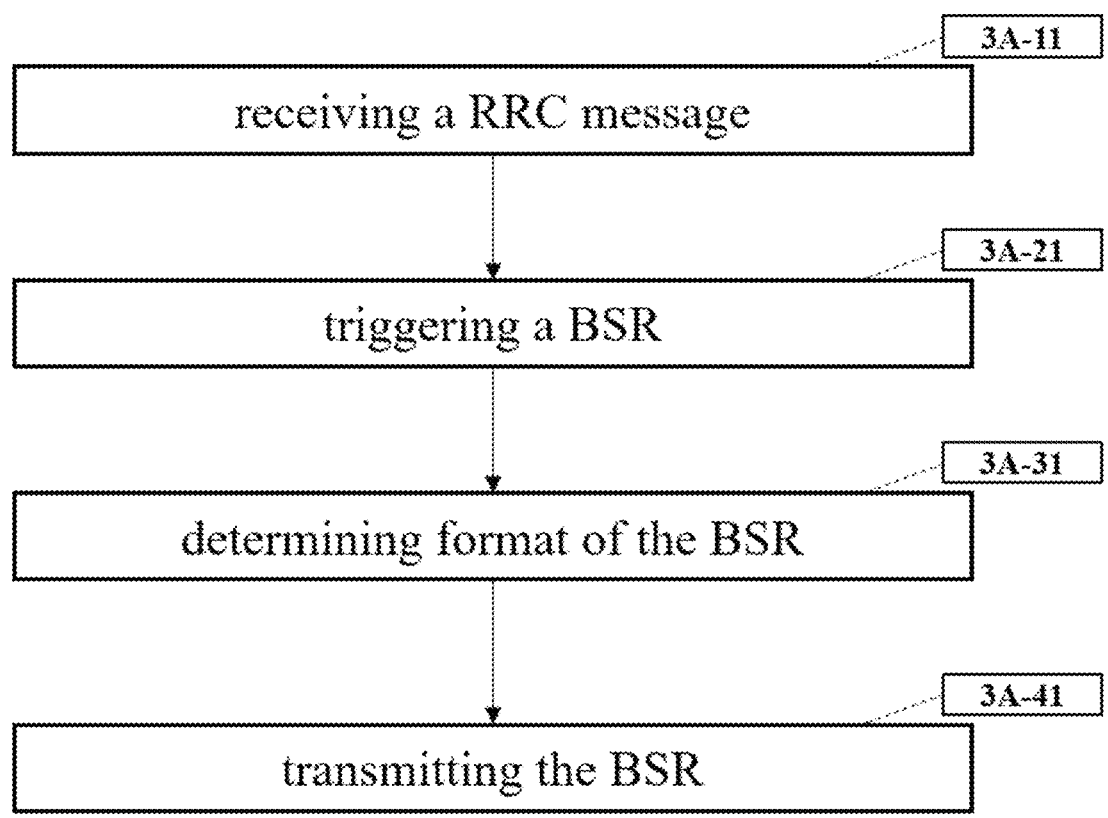
FIG. 3 is a flow diagram illustrating an operation of a terminal.

FIG. 3 illustrates UE operations. UE performs followings:
receiving a RRC message 3A-11, wherein the RRC message comprises a bitmap related to additional buffer size table;
triggering a BSR 3A-21;
determining format of the BSR 3A-31 among a first format and a second format and a third format; and
transmitting the BSR 3A-41 based on determined format.
The terminal determines the first format in case that:
only one logical channel group (LCG) has data available for transmission; and
additional buffer size table is not allowed,
The terminal determines the second format in case that:
more than one LCGs have data available for transmission; and
additional buffer size table is allowed, and
The terminal determines the third format in case that:
more than one LCGs have data available for transmission; and
additional buffer size table is not allowed.

The terminal determines, based on whether additional buffer status table is allowed, the format of the BSR between the second format and the third format in case that the BSR is triggered due to new uplink data.

The terminal determines, based on number of padding bits, the format for the BSR between the first format and the third format in case that the BSR is triggered for padding.

In case that the BSR is triggered due to new uplink data:
the second format is determined in case that additional buffer status table is allowed; and
the third format is determined in case that additional buffer status table is not allowed.

In case that the BSR is triggered for padding:
the first format is determined in case that number of padding bits is more than a specific value and less than a second specific value; and
the third format is determined in case that number of padding bit is more than the second specific value and less than a third specific value.

Terminal determines based on the bitmap related to additional buffer size table whether additional buffer size table is allowed or not.

A specific bit of the bitmap related to additional buffer size table is associated with a specific LCG.

The first format comprises:
a LCG identifier field; and
a n-bit buffer size field.

The second format comprises:
a bitmap indicating one or more LCGs;
a bitmap related to buffer size table; and
one or more m-bit buffer size fields.

The third format comprises:
the bitmap indicating one or more LCGs; and
one or more m-bit buffer size fields.

The terminal performs followings:
receiving a radio resource control (RRC) message, wherein the RRC message comprises:
a bitmap related to additional buffer size table; and
a parameter for a periodic buffer status reporting timer;
triggering a buffer status report (BSR) based on that the periodic buffer status reporting timer being expired; and
transmitting the BSR.

The BSR comprises a single n-bit buffer size field in case that:
only one logical channel group (LCG) has data available for transmission; and
additional buffer size table is not allowed, The BSR comprises a single m-bit buffer size field in case that:
only one LCG has data available for transmission; and
additional buffer size table is allowed.

m is greater than n.

The terminal determines, based on the bitmap related to additional buffer size table, whether additional buffer size table is allowed or not.

Figure 4A:
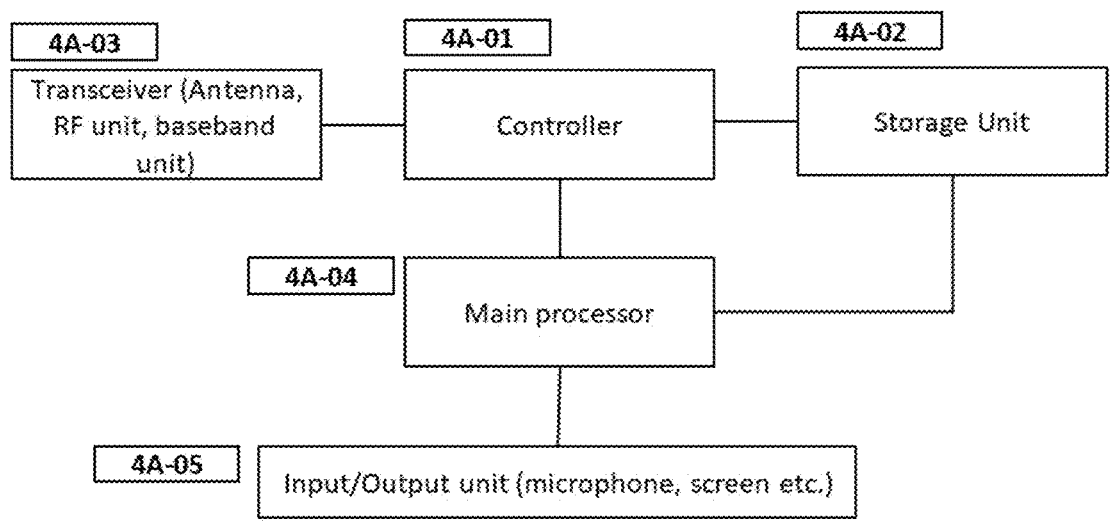
FIG. 4A is a block diagram illustrating the internal structure of a UE to which the disclosure is applied.

FIG. 4A is a block diagram illustrating the internal structure of a UE to which the disclosure is applied.

Referring to the diagram, the UE includes a controller 4A-01, a storage unit 4A-02, a transceiver 4A-03, a main processor 4A-04 and I/O unit 4A-05.

The controller 4A-01 controls the overall operations of the UE in terms of mobile communication. For example, the controller 4A-01 receives/transmits signals through the transceiver 4A-03. In addition, the controller 4A-01 records and reads data in the storage unit 4A-02. To this end, the controller 4A-01 includes at least one processor. For example, the controller 4A-01 may include a communication processor (CP) that performs control for communication and an application processor (AP) that controls the upper layer, such as an application program. The controller controls storage unit and transceiver such that UE operations illustrated in FIG. 2A and FIG. 3 are performed.

The storage unit 4A-02 stores data for operation of the UE, such as a basic program, an application program, and configuration information. The storage unit 4A-02 provides stored data at a request of the controller 4A-01.

The transceiver 4A-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 4A-04 controls the overall operations other than mobile operation. The main processor 4A-04 process user input received from I/O unit 4A-05, stores data in the storage unit 4A-02, controls the controller 4A-01 for required mobile communication operations and forward user data to I/O unit 4A-05.

I/O unit 4A-05 consists of equipment for inputting user data and for outputting user data such as a microphone and a screen. I/O unit 4A-05 performs inputting and outputting user data based on the main processor's instruction.

Figure 4B:
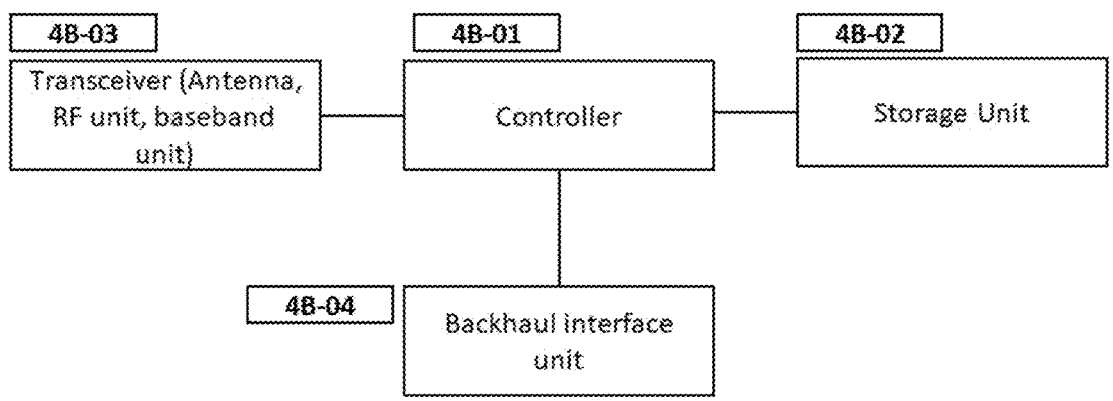
FIG. 4B is a block diagram illustrating the configuration of a base station according to the disclosure.

FIG. 4B is a block diagram illustrating the configuration of a base station according to the disclosure.

As illustrated in the diagram, the base station includes a controller 4B-01, a storage unit 4B-02, a transceiver 4B-03 and a backhaul interface unit 4B-04.

The controller 4B-01 controls the overall operations of the main base station. For example, the controller 4B-01 receives/transmits signals through the transceiver 4B-03, or through the backhaul interface unit 4B-04. In addition, the controller 4B-01 records and reads data in the storage unit 4B-02. To this end, the controller 4B-01 may include at least one processor. The controller controls transceiver, storage unit and backhaul interface such that base station operation illustrated in FIG. 2A are performed.

The storage unit 4B-02 stores data for operation of the main base station, such as a basic program, an application program, and configuration information. Particularly, the storage unit 4B-02 may store information regarding a bearer allocated to an accessed UE, a measurement result reported from the accessed UE, and the like. In addition, the storage unit 4B-02 may store information serving as a criterion to determine whether to provide the UE with multi-connection or to discontinue the same. In addition, the storage unit 4B-02 provides stored data at a request of the controller 4B-01.

The transceiver 4B-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 4B-04 provides an interface for communicating with other nodes inside the network. The backhaul interface unit 4B-04 converts a bit string transmitted from the base station to another node, for example, another base station or a core network, into a physical signal, and converts a physical signal received from the other node into a bit string.

What is claimed is:

1. A method by a terminal, the method comprising:
   receiving by the terminal a radio resource control (RRC) message, wherein the RRC message comprises a bitmap related to additional buffer size table;
   triggering by the terminal a buffer status report (BSR); and
   transmitting by the terminal the BSR,
   wherein, in case that only one logical channel group (LCG) has data available for transmission and additional buffer size table is allowed, the BSR comprises:
     more than one m-bit buffer size fields in case that the BSR is triggered for padding; and
     single instance of a m-bit buffer size field in case that the BSR is triggered for new uplink data,
   wherein, in case that only one LCG has data available for transmission and additional buffer size table is not allowed, the BSR comprises:
     more than one m-bit buffer size fields in case that the BSR is triggered for padding; and
     single instance of a n-bit buffer size field in case that the BSR is triggered for new uplink data,
   wherein the terminal determines, based on the bitmap related to additional buffer size table, whether the additional buffer size table is allowed or not, and
   wherein each bit of the bitmap related to additional buffer size table is associated with a specific LCG.

2. A terminal comprising:
   a transceiver,
   a memory, and
   a controller coupled to the transceiver and the memory, wherein the controller is configured to cause the terminal to:
     receive a radio resource control (RRC) message, wherein the RRC message comprises a bitmap related to additional buffer size table;
     trigger a buffer status report (BSR); and
     transmit the BSR,
   wherein, in case that only one logical channel group (LCG) has data available for transmission and additional buffer size table is allowed, the BSR comprises:

more than one m-bit buffer size fields in case that the BSR is triggered for padding; and single instance of a m-bit buffer size field in case that the BSR is triggered for new uplink data, wherein, in case that only one LCG has data available for transmission and additional buffer size table is not allowed, the BSR comprises:

more than one m-bit buffer size fields in case that the BSR is triggered for padding; and single instance of a n-bit buffer size field in case that the BSR is triggered for new uplink data, wherein the terminal determines, based on the bitmap related to additional buffer size table, whether the additional buffer size table is allowed or not, and wherein each bit of the bitmap related to additional buffer size table is associated with a specific LCG.

3. A method by a terminal, the method comprising:

receiving by the terminal a radio resource control (RRC) message, wherein the RRC message comprises:

a bitmap related to additional buffer size table; and a parameter for a periodic buffer status reporting timer;

triggering by the terminal a buffer status report (BSR) based on that the periodic buffer status reporting timer being expired; and transmitting by the terminal the BSR;

wherein the BSR comprises a single n-bit buffer size field in case that:

only one logical channel group (LCG) has data available for transmission; and additional buffer size table is not allowed, wherein the BSR comprises a single m-bit buffer size field in case that:

only one LCG has data available for transmission; and additional buffer size table is allowed, wherein m is greater than n, wherein the terminal determines, based on the bitmap related to additional buffer size table, whether additional buffer size table is allowed or not, and wherein each bit of the bitmap related to additional buffer size table is associated with a specific LCG.

4. The method of claim 1, wherein, in case that more than one LCG have data available for transmission and additional buffer size table is allowed:

a first format is used for the BSR in case that the BSR is triggered for padding; and a second format is used for the BSR in case that the BSR is triggered for new uplink data, and wherein, in case that more than one LCG have data available for transmission and additional buffer size table is not allowed:

the first format is used for the BSR in case that the BSR is triggered for padding; and a third format is used for the BSR in case that the BSR is triggered for new uplink data.

5. The method of claim 4, wherein the terminal determines, based on whether additional buffer status table is allowed, format of the BSR between the second format and the third format in case that the BSR is triggered due to new uplink data.

6. The method of claim 4, wherein the terminal determines, based on number of padding bits, format of the BSR between the first format and the third format in case that the BSR is triggered for padding.

7. The method of claim 4, wherein, in case that the BSR is triggered due to new uplink data:

the second format is determined in case that additional buffer status table is allowed; and the third format is determined in case that additional buffer status table is not allowed.

8. The method of claim 4, wherein the first format comprises:

a LCG identifier field; and the n-bit buffer size field.

9. The method of claim 4, wherein the second format comprises:

a bitmap indicating one or more LCGs;

a bitmap related to buffer size table; and one or more m-bit buffer size fields.

10. The method of claim 4, wherein the third format comprises:

a bitmap indicating one or more LCGs; and one or more m-bit buffer size fields.

* * * * *